Oct. 28, 1969  K. A. YOUNG  3,474,689
TORQUE TRANSMITTING DIFFERENTIAL
Filed May 31, 1967  2 Sheets-Sheet 1

INVENTOR
KENNETH A. YOUNG

BY Browne, Schuyler & Beveridge

ATTORNEYS

INVENTOR
KENNETH A. YOUNG

BY Brown, Schuyler & Beveridge

ATTORNEYS

United States Patent Office 3,474,689
Patented Oct. 28, 1969

3,474,689
TORQUE TRANSMITTING DIFFERENTIAL
Kenneth A. Young, c/o Willys-Overland-Brazil, Caixa Postal 8610, Sao Paulo, Brazil
Continuation-in-part of application Ser. No. 611,744, Jan. 25, 1967. This application May 31, 1967, Ser. No. 642,421
Int. Cl. F16h 1/44
U.S. Cl. 74—711
13 Claims

ABSTRACT OF THE DISCLOSURE

In a conventional torque transmitting differential, the improvement including a pair of friction members respectively mounted on the differential side gears to be responsive to excessive differential action whereby the friction members will move for causing frictional engagement with the differential case to reduce the differential action and ultimately balance the transmission of force between both side gears and their associated axles. The friction members are axially and rotatably movable on their associated side gears and respectively have overlying friction rings engaged on their peripheral surfaces to be engageable with corresponding friction seats formed on the internal surface of the differential case. In the inwardly disposed sides of the friction members are formed a plurality of conical cavities registering with similar cavities formed in pressure generating plates fixed on the side gears inwardly of the friction members. Pressure transmitting balls are respectively provided in the conical cavities such that when differential action occurs causing one of the side gears to "spread" or move outwardly to initially engage the associated friction ring against the seat in the case, the balls will be dislocated from centered positions in their cavities to cam the associates friction member outwardly and cause the friction ring to increasingly engage its friction seat in the case. A spring bias is imposed against the friction members preferably urging them away from the friction seats in the case. To establish a predetermined clearance between the friction rings and the friction seats in the case, a plurality of shims are mounted about the side gears between the latter and the pressure generating plates.

RELATED APPLICATIONS

This application is a continuation-in-part of my copending U.S. application Ser. No. 611,744, now abandoned, filed Jan. 25, 1967.

SUMMARY OF OBJECTS AND INVENTION

The present invention generally relates to improvements in torque-transmitting differentials of the type used with the driving wheels of an automotive vehicle.

One of the objects of the present invention is to provide a differential of the foregoing type which will give improved performance in contrast to those heretofore in use.

A further object of the present invention is the provision of such an improved differential which will insure that the drive transmitting force will be substantially equally distributed between the axles and driving wheels of an associated vehicle.

A further object is to provide such an improved differential which will produce effective traction between its associated wheels and the travelled surface even when the latter is ice, deep mud, loose sand or possesses other low frictional characteristics. Included herein is such an improved differential which will restrict the spinning of its associated wheels when bouncing over an obstruction or engaged in a hole in the surface of travel.

A still further object of the present invention is to provide such improved differential which may be employed in rounding normal curves without requiring "under steering" such as is prevalent in many differentials of the prior art.

Yet another object of the present invention is to provide a restricting device which may be incorporated as an assembly into conventional or prior art differentials to improve them in a manner obtaining the above objects. Included here is such restricting device which may be economically manufactured and incorporated into either new or old differentials where it will successfully operate over long periods of repeated and rugged use.

Achieving the above objects is a differential action restricting device comprised of a pair of friction members slidably and rotatably received on the differential side gears for example of a conventional differential. Mounted about the friction members for relative rotational movement are friction rings which are engageable against overlying friction seats in the differential case upon outer movement or "spreading action" of the associated side gears caused by excessive differential action. This frictional engagement actuates a cam device to further urge the friction members outwardly to increase the engagement of the friction rings against the differential case.

The cam device associated with each friction member includes a plurality of balls located in conical cavities formed in the inwardly disposed end of the frction member and in an adjacent pressure plate fixed to the side gear for rotation therewith. Relative rotation between the friction member and pressure plate upon engagement of friction ring against the differential case, causes the balls to dislocate from centered positions in their conical cavities to thus cam the friction member outwardly to further engage the friction ring against the friction seat in the case.

In one preferred embodiment, springs are provided to respectively bias the friction members away from their associated friction seats in the case so that under normal driving conditions or when under operating below a predetermined amount of differential action, the friction members will not engage the friction seats in the case. Additionally, to establish a predetermined clearance between the friction members and the friction seats, shims are preferably employed about the side gears. A thrust ring is provided between the side gears in order to back up and distribute between the side gears, the thrust loads resulting from the friction forces generated by the restricting device. Additionally, the thrust ring prevents the generated loads from overloading and breaking the gear teeth in the differential.

Other objects and advantages of the present invention will become apparent from the following more detailed description taken in conjunction with the attached drawings in which.

DETAILED DESCRIPTION

Figure 1:
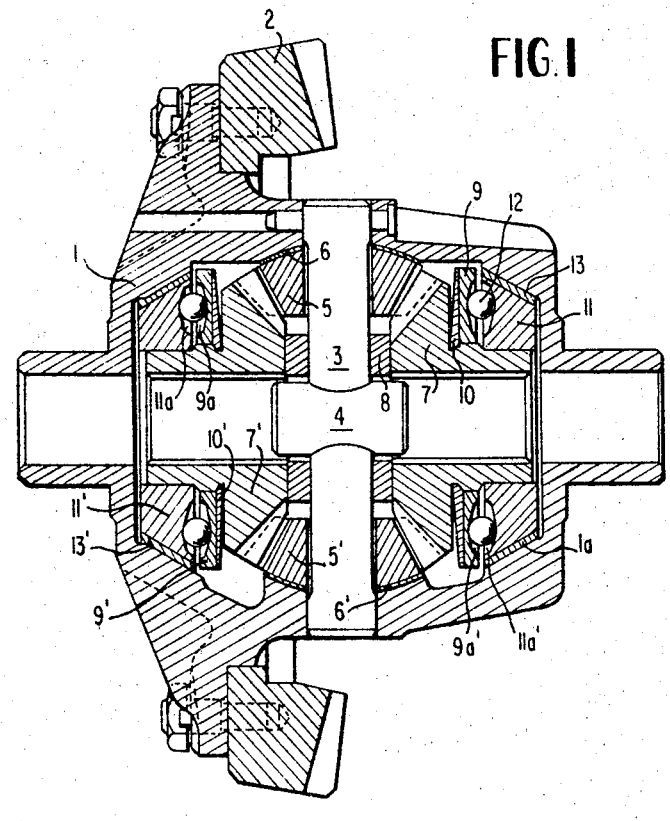
FIG. 1 is a cross-sectional view of a differential embodying the present invention taken along the axis of rotation of the differential case.

Referring to the drawings in detail, FIG. 1 shows one embodiment of the present invention including a differential case 1 having fixed thereto a typical ring gear 2 which for example may be driven from the transmission of an automobile (not shown) associated with the differential. Fixed in the differential case is a conventional pinion mate shaft 3 which passes through an opening in a spacer 4 that spaces the associated axles of the driven wheels (not shown). Received about the opposite ends of pinion mate shaft 3 are a pair of pinion mate gears 5 and 5' which are rotatable with the pinion mate shaft about the axle axis. Thrust washers 6 and 6' are shown as being interposed between the pinion mate gears 5 and 5' and the adjacent case surface, with the thrust washers being received about pinion mate shaft 3.

Driven through meshing engagement with pinion mate gears 5 and 5' are a pair of differential side gears 7 and 7' having hubs 7a which receive the axles to drive the same through a suitable internal spline connection. The structure described thus far is conventional and it will be understood that upon rotation of ring gear 2 about the axle axis together with its pinion mate shaft 3 and gears 5, 5', the side gears 7 and 7' will be driven about the same axis to in turn rotate the axles. When rounding a curve the differential permits one side gear to over travel the other to permit the wheels to turn the curve on different radii. In view of the conventional nature of the aforedescribed structure, further description in this regard is believed to be unnecessary.

Figure 2:
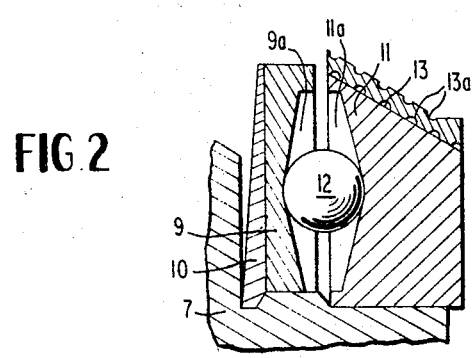
FIG. 2 is an enlarged detail view of a portion of the device appearing in FIG. 1.

In accordance with the present invention a novel restricting device is incorporated into the differential to restrict the differential action and thereby insure equal distribution of the driving force between the axles and wheels upon encountering a low friction surface condition such as may be caused by mud, ice, loose sand or excessive wheel spinning upon leaving the surface of travel. In the specific embodiment shown in FIGS. 1 and 2 the restricting device includes a pair of friction members 11 and 11' shown as frusto-conical drums rotatably and slidably positioned on the outer hubs 7a of side differential gears 7 and 7'. Conical slip friction rings 13 and 13' are freely received about the outer conical surfaces of friction cones 11 and 11' to be engageable with corresponding conical surfaces formed in the internal wall of the differential case 1 as shown in FIG. 1. Annular grooves 13a are provided in the internal and external surfaces of friction rings 13 and 13' in order to control the surface contact with their associated friction seats and thereby control the amount of friction generated therebetween. Additionally grooves 13a may be employed as oil relief passages to insure proper lubrication of rings 13 and 13'. Since friction rings 13 and 13' are free to rotate relative to friction cones 11 and 11' and also their friction seats in the differential case, "stick slip" which has often attended prior art differentials, is avoided. Any suitable material such as a bronze alloy may be employed in forming slip rings 13 and 13' while the friction cones 11 and 11' may be formed from a suitable steel.

Upon excessive differential action, friction rings 13 and 13' are actuated into engagement with their associated seats in the differential case to reduce this condition and provide proper traction effort. Movement of the friction rings 13 and 13' into engagement with the case may be described as a two step sequence occurring automatically and virtually instantaneously. When the wheels associated with the differential encounter a low friction or muddy road condition for example, one of the wheels will spin under excessive differential action, and forces will be generated between the pinion mate gears 5, 5' and the side gear 7 or 7' associated with the spinning wheel along the pitch line of the gears causing the associated side gear to move outwardly ("spreading action") to initially engage the associated slip ring 13 or 13' against the friction seat in the differential case. Relative rotation between the friction cone 11 or 11' and the associated side gear results and this is employed to actuate a cam device to increase the engagement between the friction ring and its friction seat.

In the shown embodiment, this cam device includes a plurality of steel balls 12, which may be six in number, respectively received in conical cavities formed at 11a in equi-angularly spaced locations in the inner end face of friction cones 11 and 11' and at 9a in opposite end faces formed in pressure generating plates 9 and 9'. The latter are annular in shape and fixed respectively to the hubs 7a of the differential side gears between the thrust faces 7b of the latter and the friction cones. In any suitable manner such as by a spline or key connection, pressure generating plates 9 and 9' are fixed to the respective differential side gears to rotate with them.

Springs in the form of Belleville washers 10 and 10' are employed to bias friction cones 11 and 11' with steel balls 12, 12' centrally located in their cavities, for normal operating conditions. Belleville washers 10 and 10' in the embodiment shown in FIG. 1 are located about hubs 7a of the differential side gears between the thrust faces 7b of the latter and the inner faces of pressure plates 9 and 9' through which the biasing force is transmitted. Although not shown in the drawings, it is preferred in the embodiment of FIG. 1 that the thrust faces 7b of side gears 7, 7' and the adjacent inner faces of pressure plates 7, 9' be formed with a slight conical taper to insure that the Belleville washers will not become flattened through use.

In operation and assuming excessive differential action occurs causing one of the axles to spin with little or no traction force, a pitch angle pressure will develop between the teeth of pinion mate gears 5, 5' and those of the side gear 7 or 7' associated with the spinning axle. This will cause the side gear to move (or "spread") axially outwardly to engage the associated friction ring against its seat in the case. Relative rotation between the friction cone and the pressure generating plate will result causing steel balls 12 to be displaced from their centered positions in their cavities whereupon the friction cone is cammed outwardly to increase the friction engagement between the friction ring and the case. The generated friction force is proportional to the amount of differential action and produces a thrust on the side gear reducing its speed and consequently the differential action to restore traction by balancing the driving force between both of the axles and wheels. The friction force generated between the friction rings 13, 13' and the seats in the differential case may be predetermined through the design of the conical angles of the ball cavities 9a, 11a. Additionally, through the use of annular grooves 13a in the surface of the friction rings, the area of surface contact may be designed to provide a desired amount of friction.

In order to minimize backlash between the teeth of pinion mate gears 5, 5' and side gears 7, 7' caused by the reaction thrust of the generated friction forces between friction rings 13, 13' and the case, a thrust ring 8 is interposed between the side gears as shown in FIG. 1. Crossed passages are formed in thrust ring 8 along its transverse and longitudinal axes in order to receive pinion mate shaft 3 and axial spacer 4. Thrust ring 8 also serves to back up and balance the reaction loads eminating from generated friction forces between the friction rings and the differential case whereby the reaction thrust is distributed between the side gears through the thrust ring 8.

Figure 3:
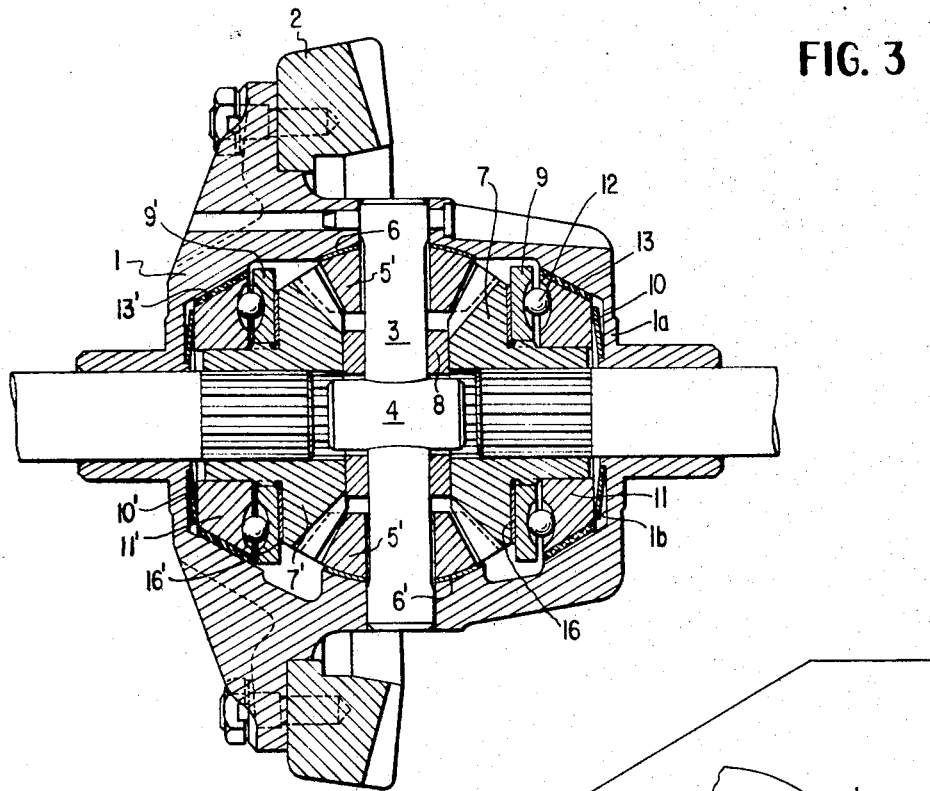
FIG. 3 is a view generally similar to FIG. 1 except with respect to a preferred embodiment of the invention.
Figure 4:
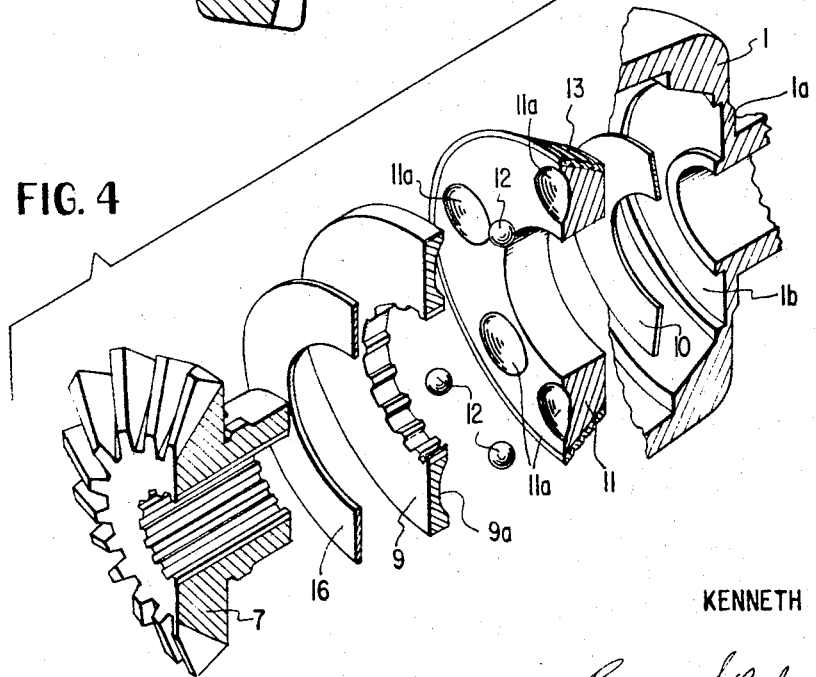
FIG. 4 is an assembly view of certain parts included in the embodiment of FIG. 3.

Referring now to FIGS. 3 and 4 there is shown a preferred embodiment of the present invention in which the Belleville spring washers 10 and 10' are removed from the location shown in the FIG. 1 embodiment and placed between the outer ends of friction cones 11 and 11' and the adjacent end walls 1a of the differential case below the friction rings. Annular passages 1b may be formed in the end walls of the differential case to receive the inner portions of the Belleville washers 10 and 10' with the outer peripheral portions thereof projecting outwardly and inwardly into engagement with the adjacent ends of friction cones 11, 11' as shown in FIG. 3. Additionally in the preferred embodiment, a pair of shims 16 are interposed about the side gear hubs 7a between the thrust faces 7b of the latter and inner end faces of the pressure generating plates 9, 9'. Preferably the shims are dimensioned to provide a tolerance of about .002–.003 inch between friction rings 13, 13' and their associated seats in their differential case under normal operating conditions during which the biasing forces of Belleville washers 10 and 10' will maintain this clearance. Moreover through the use of shims 16, a preferable clearance of about .004–.006 inch may be provided between the teeth of the pinion mate gears and the side gears which has been found to minimize backlash between these gears. The remaining parts of the preferred embodiment shown in FIGS. 3 and 4 are generally the same as those in the embodiment of FIG. 1.

In operation with the preferred embodiment, under normal operating conditions the Belleville springs will maintain a desired clearance between friction rings 13, 13' and their associated seats in the differential case. Upon excessive differential action causing relative movement between one of the side gears and its associated pressure generating plate as described above, the cam device will be energized to overcome the biasing force of the Belleville washers, and the friction ring will engage against the case to produce the required friction force to reduce the differential action and restore traction.

Moreover it will be seen that with the preferred embodiment, the Belleville spring washers 10 and 10' will exert a sufficient biasing force to maintain the friction rings spaced from their associated seats in the differential case so that for example when negotiating a normal curve, the restricting device will not generate friction forces and it will not be necessary to "under-steer" as has been necessary in many of the spring loaded friction devices of the prior art. Although in one preferred embodiment the Belleville springs 10 and 10' are designed with a spring action of 100 kgs. it will be apparent that other spring forces as well as other types of springs may be utilized in order to provide a desired effect.

From the foregoing it will be apparent that the present invention provides a unique self energizing friction unit which may be employed to increase the overall tractive effort of an associated vehicle. Additionally the device of the present invention may be incorporated into standard differentials and with varying designs depending upon the specific use of loads which will be encountered. Moreover the device of the present invention insures against damage to the differential resulting from the friction forces generated so that a long and dependable service life under rugged conditions of use is achieved.

Modifications and adaptations of the present invention readily apparent from the foregoing description and associated drawings, although not specifically mentioned herein, will nevertheless be included within the scope of the present invention as indicated in the appended claims.

I claim:

1. In a torque transmitting differential including a rotatable case, a pinion mate shaft fixed in the case for rotation therewith, a pair of pinion mate gears on opposite end portions of said shaft, and a pair of side differential gears in said case on opposite sides of said shaft in meshing engagement with said pinion mate gears; a differential action restricting device comprising in combination, a pair of friction members mounted for axial and rotational movement outwardly of the side gears respectively in coaxial relationship with said side gears, and means responsive to excessive differential action for moving said friction members outwardly into engagement with the case to produce a friction force for reducing the differential action to at least a predetermined minimum amount for traction purposes, said means including cam means responsive to outward axial movement of said gears resulting from forces generated between the pinion mate gear and said side gears upon excessive differential action, said first recited means including a pair of pressure generating plates fixed about hubs projecting outwardly on said side gears, said side gears having thrust faces extending radially outwardly from the hubs, said pressure generating plates being located between said thrust faces and said cam means, said pressure generating plates and said friction members having mutually facing ends formed with a number of registering conical cavities, said cam means further including a number of pressure transmitting balls located in said cavities such that upon relative movement between said friction members and pressure generating plates, the balls will be displaced to cam said friction members into engagement with the case.

2. The differential action restricting device defined in claim 1 wherein there are six of said conical cavities in each of said friction members and pressure generating plates and six of said balls located respectively in said cavities.

3. The differential action restricting device defined in claim 1 further including spring means biasing said friction members and pressure generating plates with said balls being biased into central positions in their respective cavities.

4. The differential action restricting device defined in claim 3 wherein said spring means biases said friction members towards contacts with said case.

5. The differential action restricting device defined in claim 4 wherein said spring means includes Belleville washers interposed between and in engagement with the outer ends of said friction members and the adjacent end walls of said case.

6. The differential action restricting device defined in claim 3 wherein said spring means biases said friction members towards contacts with said case.

7. The differential action restricting device defined in claim 6 wherein said spring means includes Belleville washers located about the side gear hubs between said thrust faces thereof and said pressure generating plates.

8. The differential action restricting device defined in claim 4 further including a pair of shims located about said hubs between the thrust faces thereof and said pressure generating plates.

9. The differential action restricting device defined in claim 8 wherein said shims are dimensioned to provide a clearance of about .002 inch to .003 inch between the friction members and the adjacent contactable portions of the case under normal operating conditions.

10. The differential action restricting device defined in claim 9 wherein said shims are dimensioned to provide a clearance of about .004 to .006 inch between the pinion mate and side gears.

11. The differential action restricting device defined in claim 1 further including a thrust member located between said side gears.

12. The differential action restricting device defined in claim 1 wherein said friction members have associated friction rings mounted thereabout to be engageable with said case, said friction rings being rotatable relative to said friction members and having a plurality of annularly extending grooves in the inner and outer surfaces thereof.

13. In a torque transmitting differential including a rotatable case, a pinion mate shaft fixed in the case for rotation therewith, a pair of pinion mate gears on opposite end portions of said shaft, and a pair of side differential gears in said case on opposite sides of said shaft in meshing engagement with said pinion mate gears; a differential action restricting device comprising in combination, a pair of friction members mounted for axial and rotational movement outwardly of and relative to said side gears respectively in coaxial relationship with said side gears, and cam means situated between said side gears and said friction members to be responsive to excessive differential action for moving said friction members outwardly into engagement with the case to produce a frictional force for reducing the differential action to at least a predetermined minimum amount for traction purposes, said friction members having radial faces facing said side gears respectively, said cam means including a number of conical cavities formed in said radial faces, and a number of pressure transmitting balls located in said cavities to be movable in said cavities upon differential action to cam said friction members into engagement with the case, a pair of pressure generating members located between said friction members and said side gears in engagement with said balls, means fixing said pressure generating members for rotational movement with said side gears, said side gears having axially projecting hub portions with said pressure generating members being fixed about said hub portions respectively for movement therewith, said friction members having aligned central passages receiving said hub portions of said pinion mate gears with the friction members being movable axially and rotatably relative to said hub portions, said case having a pair of conical friction seats formed therein adjacent said friction members, said friction members having conical external surfaces, and a pair of conical friction rings mounted on said conical surfaces respectively to be engageable with the friction seats in said case, said friction rings being rotatable relative to said friction members and having a plurality of annularly extending grooves on the inner and outer surfaces thereof.

References Cited

UNITED STATES PATENTS

| | | | |
|---|---|---|---|
| 1,556,101 | 10/1925 | Goodhart | 74—711 |
| 2,234,591 | 3/1941 | Fitzner | 74—711 |
| 2,248,764 | 7/1941 | Krenzke | 192—66 |
| 2,855,805 | 10/1958 | Fallon | 74—711 |
| 3,027,781 | 4/1962 | O'Brien | 74—711 |
| 3,051,020 | 8/1962 | Hartupee | 74—710.5 |
| 3,330,169 | 7/1967 | Carrico et al. | 74—711 |
| 3,365,983 | 1/1968 | Jeakle | 74—711 |
| 1,274,778 | 8/1918 | Prescott | 192—107 |
| 1,285,718 | 11/1918 | Jeffers | 192—107 |
| 2,743,792 | 5/1956 | Ransom | 192—113 X |

FOREIGN PATENTS

| | | |
|---|---|---|
| 927,924 | 6/1963 | Great Britain. |

DONLEY J. STOCKING, Primary Examiner

THOMAS C. PERRY, Assistant Examiner

U.S. Cl. X.R.

192—107, 113